United States Patent
Tanaka et al.

(10) Patent No.: US 7,404,389 B2
(45) Date of Patent: Jul. 29, 2008

(54) DIRECT INJECTION INTERNAL COMBUSTION ENGINE

(75) Inventors: Daijiro Tanaka, Iwata (JP); Yuichi Suzuki, Iwata (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 10/928,711

(22) Filed: Aug. 27, 2004

(65) Prior Publication Data

US 2005/0081820 A1 Apr. 21, 2005

Related U.S. Application Data

(63) Continuation of application No. PCT/JP03/02392, filed on Feb. 28, 2003.

(30) Foreign Application Priority Data

Feb. 28, 2002 (JP) ............................. 2002-054358

(51) Int. Cl.
*F02B 3/02* (2006.01)
(52) U.S. Cl. ...................... 123/295; 123/298; 123/467; 123/305
(58) Field of Classification Search ................ 123/295, 123/305, 298, 90.11, 90.15, 443, 467; 239/533.12
See application file for complete search history.

(56) References Cited

U.S. PATENT DOCUMENTS

| 3,572,298 | A | * | 3/1971 | Shigeru et al. .............. 123/301 |
| 5,170,758 | A | * | 12/1992 | Chmela ....................... 123/276 |
| 5,492,277 | A | * | 2/1996 | Tani et al. ................. 239/585.5 |
| 5,518,182 | A | * | 5/1996 | Sasao .......................... 239/412 |
| 5,540,388 | A | * | 7/1996 | Sasao ....................... 239/417.3 |
| 5,553,790 | A | * | 9/1996 | Findler et al. ............. 239/585.1 |
| 5,709,190 | A | | 1/1998 | Suzuki |
| 6,045,063 | A | | 4/2000 | Koike et al. |
| 6,334,427 | B1 | * | 1/2002 | Nakayama et al. .......... 123/305 |
| 6,345,601 | B1 | * | 2/2002 | Miyajima et al. ........... 123/305 |
| 6,363,909 | B1 | * | 4/2002 | Tomoda et al. .............. 123/295 |
| 6,588,399 | B2 | * | 7/2003 | Okamoto et al. ............ 123/305 |
| 6,659,070 | B2 | * | 12/2003 | Sebastian et al. ............ 123/298 |
| 6,742,493 | B2 | * | 6/2004 | Ziegler et al. ............... 123/305 |
| 6,883,491 | B2 | * | 4/2005 | Arndt et al. ................. 123/305 |
| 6,948,474 | B2 | * | 9/2005 | Yamaguchi et al. ......... 123/295 |

(Continued)

FOREIGN PATENT DOCUMENTS

JP 08-177497 9/1996

(Continued)

OTHER PUBLICATIONS

Search Report in 2 pages.

(Continued)

*Primary Examiner*—Hai H Huynh
(74) *Attorney, Agent, or Firm*—Knobbe, Martens, Olson & Bear, LLP

(57) ABSTRACT

A direct injection engine has a fuel injection valve that directs a spray of fuel to each side of a spark plug electrode. The fuel mixes with the air to define a region of relatively richer air-fuel mixture and a region of relatively leaner air-fuel mixture. The electrode is positioned within the relatively leaner region.

27 Claims, 2 Drawing Sheets

U.S. PATENT DOCUMENTS

| | | | |
|---|---|---|---|
| 7,021,280 B2* | 4/2006 | Nomura | 123/305 |
| 7,055,490 B2* | 6/2006 | Suzuki et al. | 123/276 |
| 7,275,515 B2* | 10/2007 | Ikoma | 123/305 |
| 2001/0018904 A1 | 9/2001 | Suzuki et al. | |
| 2004/0011326 A1* | 1/2004 | Yamashita et al. | 123/305 |
| 2006/0207547 A1* | 9/2006 | Saito | 123/260 |

FOREIGN PATENT DOCUMENTS

| | | |
|---|---|---|
| JP | 09-119315 | 5/1997 |
| JP | 10-089127 | 7/1998 |
| JP | 2000-220460 * | 8/2000 |
| JP | 2000-345944 | 12/2000 |

OTHER PUBLICATIONS

English Translation of Form PCT/IPEA/409.

A first Office Action with translation, from the Patent Office of the People's Republic of China, Patent Application No. 03804911.2, Application Date Feb. 28, 2003, Dated Dec. 1, 2006, Titled In-Cylinder Fuel Injection Type Internal Combustion Engine.

European Search Report; Mar. 7, 2008; 3 pages.

* cited by examiner

DIRECT INJECTION INTERNAL COMBUSTION ENGINE

RELATED APPLICATIONS

This application is a continuation of PCT Application No. PCT/JP03/02392, filed on Feb. 28, 2003, which claims priority to Japanese Patent Application No. 2002-054358, filed on Feb. 28, 2002, and both applications are hereby incorporated by reference in their entirety.

BACKGROUND OF THE INVENTION

1. Field of the Invention

The present invention generally relates to a direct injection internal combustion engine and more particularly relates to such an engine in which the fuel is supplied in a stratified manner with a lean mixture proximate a spark plug electrode and a rich mixture proximate a cylinder wall.

2. Description of the Related Art

Japanese Patent Application No JP-A-2000-345944 disclosed a direct injected internal combustion engine. The engine comprised a cylinder bore and a cylinder head. A piston was positioned in the cylinder bore and reciprocated therein. The cylinder head had an intake passage in one side portion and an exhaust passage in the other side portion. A fuel injection valve was provided that injected fuel obliquely downward from one side of the cylinder head into the cylinder bore. A spark plug was located approximately on a central longitudinal axis of the cylinder bore. The spark plug had an electrode, or discharging part, that was positioned within the cylinder bore. The electrode would ignite the air-fuel mixture contained within a combustion chamber portion of the cylinder bore.

During operation, the fuel injection valve injected fuel during a compression stroke of the piston. The injected fuel collided with a top surface of the piston. The collision directed the injected fuel toward the electrode of the spark plug as shown in FIGS. 7 and 8 in the patent document. In other words, a rich air-fuel mixture layer was positioned about the electrode, which would reliability ignite during operation of the internal combustion engine. A more lean air-fuel mixture layer would adjoin the rich air-fuel mixture and the more lean mixture would be ignited by the flame generated when the rich air-fuel mixture ignited. This is known as a stratified charge combustion method. As used herein stoichiometric is an air-fuel mixture of 14.7:1 and a leaner mixture has a higher than stoichiometric ratio (e.g., 17:1) while a richer mixture has a lower than stoichiometric ratio (e.g., 12:1).

When stratified charge combustion is established, ignition can be reliably achieved as described above and greater fuel efficiency can be achieved. The improved fuel efficiency results because a portion of the overall air-fuel mixture contains less fuel relative to the region proximate the electrode. Reliable combustion of the overall lean mixture results even during low load operation.

SUMMARY OF THE INVENTION

In the prior art described above, the fuel injected from the fuel injection valve generally is directed toward a longitudinal center axis of the cylinder bore. Thus, the air-fuel ratio of the portion of the air-fuel mixture that lies in the peripheral area (e.g., the region closest to the inside surface of the cylinder bore) tends to be relatively lean (i.e., more air in the mixture relative to the amount of fuel). The lean mixture tends to burn more slowly. As a result, it takes time until ignition occurs by the flame propagating through the air-fuel mixture in the peripheral area, which can cause knocking in this area. Knocking tends to be exacerbated by higher compression ratios. Thus, one technique to reduce the likelihood of knocking is reducing the compression ratio; however, reduced compression ratios result in decreased fuel efficiency.

Thus, one aspect of the present invention lies with the recognition that improved operation and fuel economy can result if the air-fuel ratio is relatively richened about the periphery relative to the portion of the combustion chamber proximate the spark plug electrode. An object of certain embodiments of this invention is to provide an internal combustion engine which has a high compression ratio and which operates with high fuel efficiency even when the average air-fuel ratio of the air-fuel mixture in the cylinder bore is lean as a whole, such as typically encountered during low load operation.

Another aspect of the present invention provides a direct injection internal combustion engine comprising: a cylinder having a cylinder bore with a longitudinal axis; a cylinder head having an intake passage in one side part thereof and an exhaust passage in another side part thereof as viewed in a side view of the cylinder in which the axis of the cylinder bore is coincident with a generally vertical line; a fuel injection valve which can inject fuel obliquely downward into the cylinder bore from the side part of the cylinder head having the intake passage; and a spark plug located generally on the longitudinal axis of the cylinder bore and having an electrode positioned in the cylinder bore, in which the fuel injected from the fuel injection valve forms a general V-shape with the electrode positioned between two legs of the general V-shape as viewed in a plan view of the cylinder and in which each of the two legs are spread out in a general fan shape as viewed in the side view of the cylinder, and the fuel injection valve is configured to inject the fuel during an intake stroke.

In other aspects of the present invention, the internal combustion engine may further comprise a variable valve timing device for changing the opening and/or closing timing of at least one of an intake valve and an exhaust valve or a variable valve lift device for changing the lift of at least one of the intake valve and the exhaust valve. In some embodiments, the timing and the lift of at least one of the intake valve and the exhaust valve can be varied.

An additional aspect of the present invention involves a direct injection internal combustion engine comprising a cylinder comprising a cylinder bore defined by a cylinder wall formed in a cylinder block. The cylinder bore is generally cylindrical with a longitudinally extending center axis. A cylinder head is attached to the cylinder block. The cylinder head comprises an intake passage that extends through a first portion of the cylinder head and an exhaust passage that extends through a second portion of the cylinder head. An intake opening is defined at an intersection of the intake passage and a lower surface of the cylinder head. An intake valve is positioned within the intake opening. An exhaust opening is defined at an intersection of the exhaust passage and the lower surface of the cylinder head. An exhaust valve is positioned within the exhaust opening. A fuel injection valve extends through a portion of the cylinder head proximate the first portion of the cylinder head. The fuel injection valve is positioned to inject fuel obliquely downward into the cylinder bore. A spark plug extends through the cylinder head and has an electrode. The electrode is positioned within a region defined among the lower surface of the cylinder head, the cylinder wall and a piston. The electrode is intersected by the center axis. The fuel injection valve comprises a tip that forms a V-shaped spray pattern having a first leg and a second leg. The electrode is positioned between the first leg and the second leg and each leg has a generally fan configuration when viewed in a direction transverse to the center axis. The engine further comprises a controller that is adapted to initiate fuel injection during an intake stroke of the piston within the cylinder bore.

A further aspect of the present invention involves a direct injection internal combustion engine comprising a cylinder comprising a cylinder bore defined by a cylinder wall. The cylinder bore is generally cylindrical with a longitudinally extending center axis. A cylinder head cooperates with the cylinder wall to at least partially define a combustion chamber. The cylinder head comprises an intake passage that extends through a first portion of the cylinder head and an exhaust passage that extends through a second portion of the cylinder head. A fuel injection valve extends through a portion of the cylinder head. The fuel injection valve is positioned to inject fuel directly into the cylinder bore. A spark plug extends through the cylinder head and has an electrode that is positioned within the combustion chamber. Means are provided for creating a generally stratified air-fuel charge in which a relatively leaner air-fuel mixture region is provided proximate the electrode of the spark plug and a relatively richer air-fuel mixture region is provided beyond the relatively leaner air-fuel mixture region when the overall air-fuel mixture comprises a higher than stoichiometric air-fuel mixture.

BRIEF DESCRIPTION OF THE DRAWINGS

These and other features, aspects and advantages of the present invention will now be described with reference to the drawings of a preferred embodiment, which embodiment is intended to illustrate and not to limit the invention, and in which figures.

DETAILED DESCRIPTION OF THE PREFERRED EMBODIMENT

Figure 1:
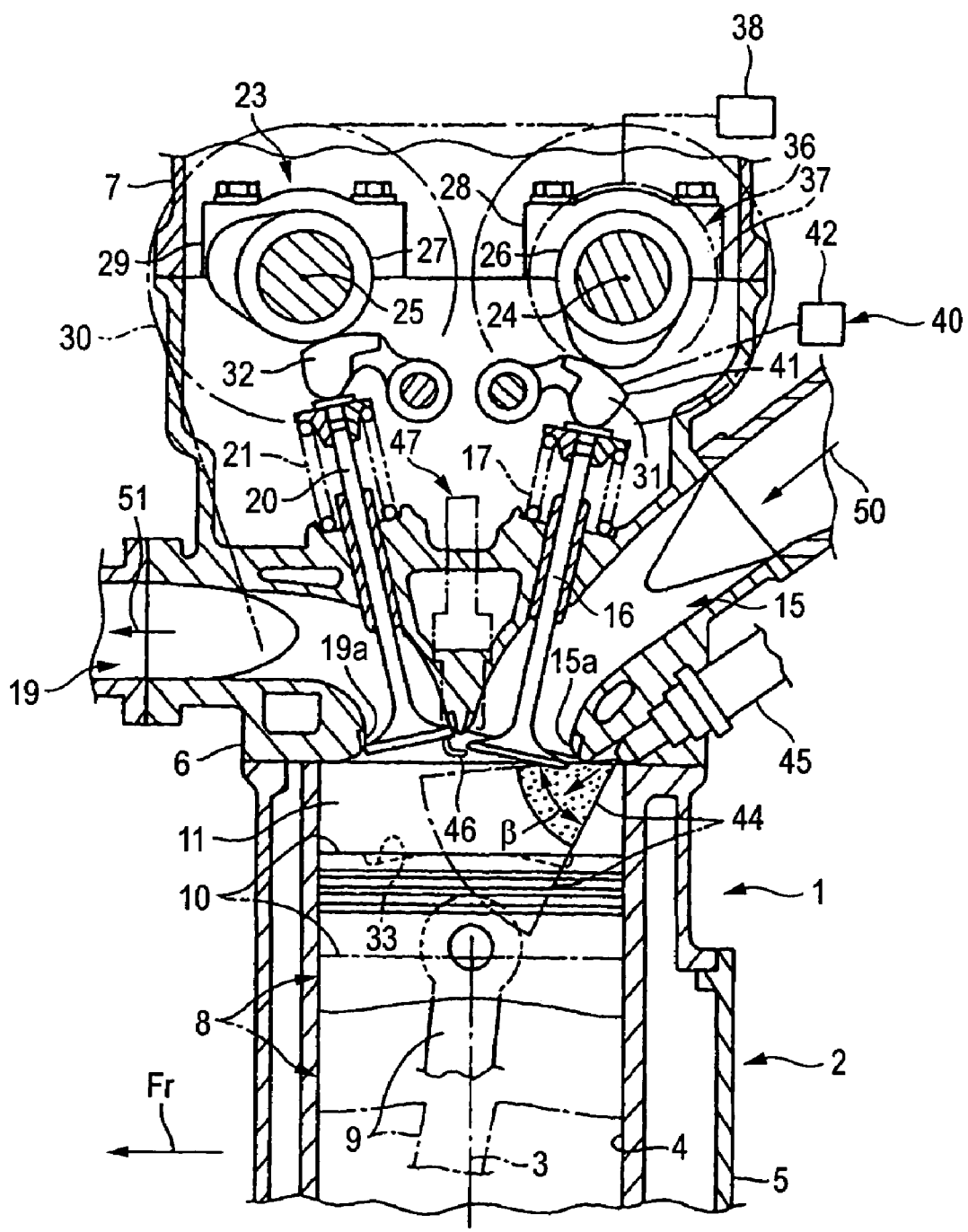
FIG. 1 is a partial cross-sectional side view of an internal combustion engine comprising a fuel injection valve, cylinder body and piston that are arranged and configured in accordance with certain features, aspects and advantages of the present invention.

With reference initially to FIG. 1, an internal combustion engine 1 is shown. The engine 1 can be mounted on a vehicle, such as a motorcycle, an automobile, a watercraft or the like. Preferably, the internal combustion engine 1 is a multi-cylinder, four-stroke engine. The engine 1 can have any number of cylinders and configurations (e.g., inline, V, etc.). Moreover, the cylinders can be vertically arranged, inclined or the like.

A portion of a vehicle body, frame or the like preferably supports a crankcase of the internal combustion engine 1. The crankcase houses and supports a crankshaft (not shown) in any suitable manner. The crankcase defines a portion of an engine block and the engine block defines one or more cylinders 2 that generally extend away from the portion of the crankcase that would house the crankshaft.

A cylinder body 5 defines a cylinder bore 4 for each of the cylinders 2. Each cylinder bore 4 preferably extends away from the crankcase and comprises a generally longitudinal axis 3. In the arrangement shown in FIG. 1, the axis 3 is generally coincident with a substantially vertical line. The cylinder body 5 preferably defines an inner wall of each cylinder 2. In some arrangements, the cylinder body 5 can be sleeved such that the inner wall of the sleeve defines the inner wall of the cylinder. In any event, as used herein, the cylinder body 5 can comprise such a cylinder sleeve.

A cylinder head 6 closes an upper end of the cylinder bore 4. Bolts or the like can removably fix the cylinder head 6 to the upper end of the cylinder body 5. A cylinder head cover 7 and the cylinder head 6 define a cam chamber in the illustrated arrangement. Bolts or the like can attach the cylinder head cover 7 to the cylinder head 6.

A piston 8 reciprocates within the cylinder bore 4 in any suitable manner. In the illustrated arrangement, the piston 8 reciprocates along the generally longitudinal axis of the cylinder bore 4. A connecting rod 9 connects the piston 8 to an offset lobe of the crankshaft such that axial movement of the piston 8 induces rotational movement of the crankshaft.

The inner wall of the cylinder bore 4, a lower surface of the cylinder head 6, and a top surface 10 of the piston 8 define a variable volume combustion chamber. The combustion chamber has its smallest volume when the piston 8 is in a top dead center position and the combustion chamber has its largest volume when the piston 8 is in a bottom dead center position.

FIG. 1 presents a side view of the cylinder 2. As shown, an arrow Fr indicates a preferred forward direction of the internal combustion engine. As illustrated, the forward direction is generally normal to the axis 3. As used herein, any references to right and left are taken when looking in the direction of the arrow Fr.

With reference now to FIG. 1, the cylinder head 6 preferably defines an intake passage 15. The illustrated intake passage 15 extends generally forward from a downstream portion of an induction system to the combustion chamber 11. Thus, the illustrated intake passage 15 extends to the combustion chamber 11 through a rear side of the cylinder head 6. The intake passage 15 can extend in other directions, if desired; however, by extending the intake passage 15 in a forward direction, the portion of the vehicle generally above and slightly to a rear of the engine 1 can be used to house at least a majority of the induction system, such as on an all terrain vehicle or a motorcycle, for instance. The illustrated intake passage 15 terminates in a left branch and a right branch and can include an inner portion of an intake pipe that is connected to the cylinder head.

Moreover, when viewed from the side (see FIG. 1), a majority of the intake passage 15 approaches the combustion chamber 11 at an acute angle relative to the axis 3 such that minimal change in flow direction occurs with respect to the air being introduced into the combustion chamber through the intake passage 15. In other words, the intake passage 15 comprises a bend of substantially less than 90 degrees between its inlet and its outlet. Such an arrangement greatly reduces the inhalation resistance created within the intake passage 15 and allows a greatly increased level of air flow relative to so-called tumble ports or high swirl ports.

The cylinder head supports a pair of intake valves 16 for each cylinder. A right intake valve and a left intake valve define the pair of intake valves 16 for each cylinder, which valves 16 can open and close corresponding right and left openings 15a. The intersection of the inner lower surface of the cylinder head and branches of the intake passage 15 define the openings 15a in the illustrated arrangement. The valves 16 control the opening and closing of the openings 15a such that the valves control flow into and/or out of the combustion chamber 11 via the intake passage 15. Preferably, each of the intake valves 16 has a spring 17 or other biasing construction that urges the intake valve 16 to a closed position.

The cylinder head 6 also defines one or more exhaust passages 19 in the illustrated arrangement. The exhaust passage 19 extends between the combustion chamber 11 and an outside of the cylinder head 6. The exhaust passage 19 preferably extends through a different region of the cylinder head 6 relative to the intake passage 15. In the illustrated arrangement, the exhaust passage 19 extends through a forwardly disposed portion of the cylinder head 6. Placement of the exhaust passage 19 on a forward portion of the cylinder head 6 allows the exhaust system to wrap rearward such that the overall length of the exhaust system can be increased.

In the illustrated arrangement, the exhaust passage 19 defines a right opening and a left opening such that the passage 19 defines a pair of openings 19a to the combustion chamber 11. A right exhaust valve and a left exhaust valve define a pair of exhaust valves 20 that can open and close the right and left openings 19a, respectively. The cylinder head 6 preferably supports the exhaust valves 20. Preferably, each of the exhaust valves 20 has a spring 21 or other biasing construction that urges the exhaust valve 16 to a closed position.

The illustrated internal combustion engine 1 comprises a valve mechanism 23 operatively connected to the crankshaft for opening and closing the intake valves 16 and the exhaust valves 20 at predetermined crank angles. The cam chamber preferably houses the valve mechanism 23.

In the illustrated arrangement, the valve mechanism 23 comprises intake and exhaust camshafts 26, 27. The camshafts 26, 27 preferably extend in a generally lateral direction. The camshafts 26, 27 generally define axes 24, 25 about which the camshafts rotate. Bearings 28, 29 support and journal the intake and exhaust camshafts 26, 27 relative to the cylinder head 6 such that the camshafts 26, 27 can rotate about the longitudinal axes 24, 25, respectively. Moreover, a belt or chain type power transmission 30 drives the camshafts 26, 27 from output provided by the crankshaft. Other drive mechanisms can be used. Rocker arms 31, 32 extend between the respective valves 16, 20 and the camshafts 26, 27. Other valve mechanisms also can be used, including, but not limited to, hydraulic actuators, solenoid driven arrangements, and other electromechanical structures.

When the crankshaft is driven, the power transmission means rotates the intake and exhaust camshafts 26 and 27 in a timed relationship. Then, the camshafts 26, 27 actuate the rocker arms 31, 32, which actuate the intake and exhaust valves 16, 20 such that the valves 16, 20 open and close at predetermined crank angles.

To increase the compression ratio of the internal combustion engine 1, the volume of the space between the lower surface of the cylinder head 6 and the top surface 10 of the piston 8 preferably is small. That is, the lower surface of the cylinder head 6 and the top surface 10 of the piston 8 preferably are fairly close to each other when the piston 8 reaches its top dead center position. In the illustrated arrangement, the top surface 10 of the piston 8 comprises shallow recesses 33 which can accommodate the lower ends of the intake and exhaust valves 16, 20. As can be appreciated, with the piston 8 coming in close proximity of the lower surface of the cylinder head 6, the upper surface of the piston 8 preferably provides clearance for the lower ends of the intake and exhaust valves 16, 20 such that the valves do not inadvertently contact the top surface 10 of the piston 8 if the valves 16, 20 are not in the closed position when the piston 8 approaches, reaches or departs from its top dead center position.

The valve mechanism 23 preferably comprises a suitable variable valve timing device 36. The variable valve timing device changes the timing (e.g., the crank angles) at which the intake valves 16 are opened and closed. In one arrangement, the variable valve timing device 36 has a hydraulic variable mechanism 37 interposed between the intake camshaft 26 and the power transmission 30. In the same arrangement, the variable valve timing device 36 also preferably comprises a controller 38 that electronically controls the hydraulic variable mechanism 37. When the controller 38 operates the hydraulic variable mechanism 37, the timing of the opening and closing of the intake valves 16, which are in engagement with the intake camshaft 26, is advanced or retarded. The exhaust valves also can have a variable valve timing device.

The valve mechanism 23 preferably also comprises a suitable variable valve lift device 40. The variable valve lift device changes the lift of the intake valves 16. The variable valve lift device 40 preferably comprises a variable mechanism 41 for changing the engagement state between the intake valves 16 and the intake camshaft 26 and a controller 42 for electronically controlling the variable mechanism 41. When the controller 42 operates the variable mechanism 41, the variable mechanism 41 increase or decreases the lift of the intake valves 16. The exhaust valves also can have such a variable lift device.

The cylinder head 6 also supports a fuel injection valve 45. The illustrated fuel injection valve 45 injects fuel jets 44 obliquely downward into the cylinder bore 4 from a rear portion of the cylinder head 6. The fuel injection valve 45 preferably is positioned proximate the intake passages 15 or the intake openings 15a. More preferably, the fuel injection valve 45 emits the fuel jets 44 in a direction and the air flows into the combustion chamber 11 from the intake passages 15 in the same general direction as the direction of the fuel jets 44 for reasons that will be discussed below.

The cylinder head 6 also supports a spark plug 47 or other sparking device approximately on the axis 3 of the cylinder bore 4. The spark plug 47 comprises an electrode 46, or a discharging part, positioned in the combustion chamber 11 in the cylinder bore 4. Preferably, the axis 3 intersects the electrode 46. An engine controlling device (not shown) preferably electronically communicates with and/or operates the controllers 38 and 42, the fuel injection valve 45 and the spark plug 47 in a coordinated integrated engine management system.

The illustrated fuel injection valve 45 comprises a pair of injection nozzles 49 or apertures through which the fuel passes to define the fuel jets 44. Each injection nozzle 49 preferably comprises an opening that is generally rectangular in configuration. In the illustrated arrangement, the nozzles 49 are generally identical in configuration and are arranged to have a major axis and a minor axis. The injection nozzles 49 preferably have a width W of 100 to 200 µm. In most configurations, the width W of the nozzles 49 is less than one fourth of the transverse dimension of the nozzles 49. When properly positioned within the cylinder head 6, the axis 3 generally bisects the major axes of the nozzles 49.

The tip of the valve 45 in which the nozzles 49 are defined preferably is generally hemispherical. In some arrangements, the tip can be barrel shaped or flat; however, the generally hemispherical configuration is believed to improve the performance and durability of the fuel injection valves 45.

The fuel jets 44 ejected from the injection nozzles 49 generally define a V-shape with the electrode 46 being positioned between the legs of the V-shape when viewed in a plan view of the cylinder 2. In other words, the jets diverge from each other in a direction of injection. The center lines of the fuel jets 44 preferably define an angle α of about 35°. A preferred range of the angle α is between about 30° to about 50°.

Since the width W of the injection nozzles 49 is as very small as 100 to 200 μm as described above, the fuel jets 44 emitted from the injection nozzles 49 have a high injection speed. Thus, the fuel 44 is generally atomized, which improves ignition of the air-fuel mixture. Moreover, the high injection speed resulting from the relatively narrow width of the nozzles 49 facilitates movement of the fuel 44 in a single direction toward desired positions of the cylinder bore 4 such that the uniformity of engine operation over a broad spectrum of engine operating conditions can be improved. The improvement results for the ability to reliably direct the fuel 44 to desired locations within the combustion chamber 11.

With reference to FIG. 1, the jets of the fuel 44 injected from the fuel injection valve 45 expand in a fan shape or a sector shape as seen in the side view of the cylinder 2. The fan shape results from the elongated major axis of the nozzles 49. The injected fuel 44 expands at an angle β of about 75°. A preferable range of the angle β is between about 60° to about 80°.

Figure 2:
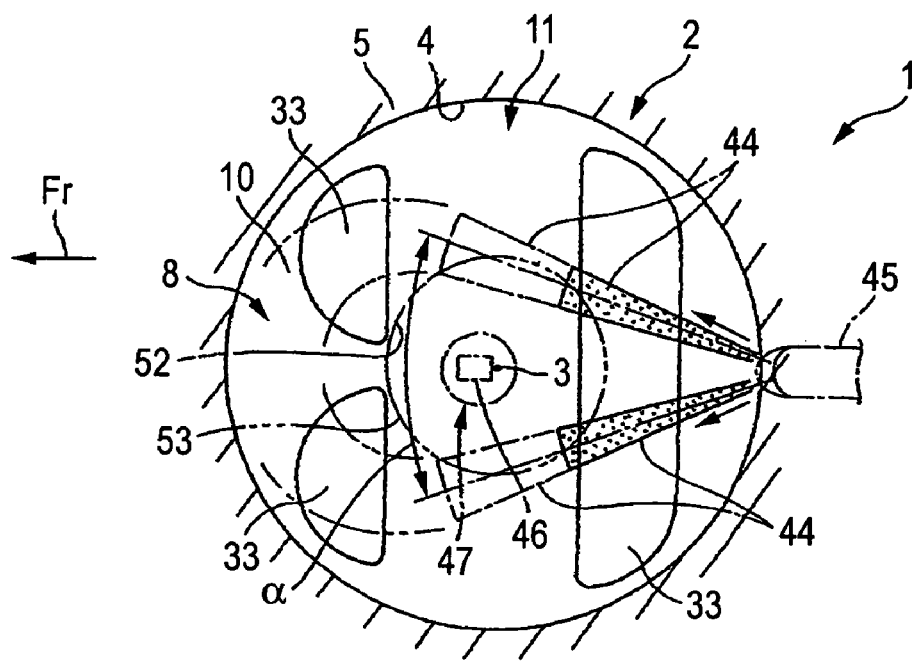
FIG. 2 is a top plan view of a portion of the engine of FIG. 1 showing the piston, the fuel injection valve, a side wall of the cylinder body and a fuel injection pattern.
Figure 3:
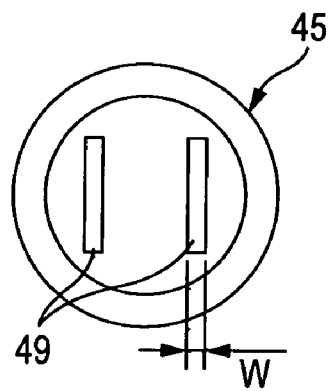
FIG. 3 is a front view of a fuel injection valve showing a pair of generally linear orifices.

As described directly above, the fuel jets 44 injected by the fuel injection valve 45 generally assume a fan shape as seen in a side view of the cylinder 2 (see FIG. 1) with a small lateral flaring (see FIG. 2). Thus, a majority of the fuel injected by the fuel injection valve 45 is more likely to spray across the cylinder bore and be directed by the inner wall of the cylinder bore to create a more uniform air-fuel ratio as compared with conical jets of fuel provided by more conventional fuel injectors. Thus, the rich air-fuel mixture layer 52 is more likely to be reliably formed into a desired doughnut shape on a consistent basis. Therefore, the likelihood of knocking caused by divergent pockets of air-fuel mixtures can be greatly reduced.

When the internal combustion engine 1 operates, the valve mechanism 23 opens and closes the intake and exhaust valves 16, 20. Then, opening the intake valve 16 allows the induction of atmospheric air 50 into the cylinder bore 4 through the intake passages 15. The fuel jets 44 introduce fuel from the fuel injection valve 45 into the cylinder bore 4 to produce an air-fuel mixture with the air during an intake stroke. The piston 8 compresses the air-fuel mixture during the compression stroke following the intake stroke.

Then, the electrode 46 of the spark plug 47 ignites the compressed air-fuel mixture and the air-fuel mixture burns within the combustion chamber 11. The resulting combustion by-products are exhausted through the exhaust passage 19 as exhaust gas 51. The driving force of the internal combustion engine 1 generated by the combustion in the combustion chamber 11 is transmitted to the crankshaft and used to drive the vehicle.

When the internal combustion engine 1 operates at high speed, the variable valve timing device 36 retards the timing (e.g., crank angles) at which the intake valves 16 open and close to increase the output of the engine. Also, the variable valve lift device 40 can increase the lift of the intake valves 16 to increase the amount of air 50 that can flow into the combustion chamber 11. A variable valve timing device and a valve lift device for the exhaust valves 20 may be provided instead of or in addition to the variable valve timing device 36 and the variable valve lift device 40 for the intake valves 16.

In operation, when the piston 8 is in the top dead center position or immediately after the piston 8 starts descending from the top dead center position during an intake stroke, the controller actuates the fuel injection valve to start injecting fuel into the combustion chamber 11 in the cylinder bore 4 (see FIGS. 1 and 2). Preferably, the fuel injection valve 45 continues to inject fuel until the piston 8 reaches a desired location between top and bottom dead center positions.

The fuel injection valve 45 injects the fuel into the cylinder bore 4 from the side of the cylinder head 6 that contains the intake passage 15. Thus, the fuel and the air enter the combustion chamber in the same general direction as shown in the side view of the cylinder 2 (see FIG. 1). Since the fuel injected from the injection valve 45 does not have to travel against the air 50 flowing into the cylinder bore 4 through the intake passage 15, the fuel jets 44 are less likely to be disturbed. Accordingly, the fuel jets 44 can consistently maintain movement in the injection direction without substantial changes to the shape of the fuel jets 44.

In addition, the fuel jets 44 injected from the fuel injection valve 45 generally form a V-shape with the electrode 46 of the spark plug 47 being positioned between them. As stated above, the piston 8 preferably is in a downward intake stroke when the controller initiates injection of the fuel through the fuel injection valve 45. Thus, the piston 8 and the fuel of the fuel jets 44 are both moving downward such that the piston 8 is less likely to redirect the fuel toward the electrode 46 of the spark plug 47.

Accordingly, the fuel injected by the fuel injection valve 45 advantageously passes to both sides of the electrode 46 and are less likely to contact the top surface 10 of the piston 8. As a result, the fuel jets 44 are very likely to consistently and smoothly travel in the direction in which they have been injected (as shown by dot-dash lines in FIGS. 1 and 2).

When the tips of the fuel jets 44 reach the inner wall of the cylinder bore 4 and the top surface 10 of the piston 8, the fuel jets 44 then can be guided by the surfaces. Thus, portions of the fuel jets 44 can flow in a circumferential direction along or adjacent to the inner surface of the cylinder bore 4. These portions of the fuel jets 44 can approach each other in the circumferential direction of the inner surface of the cylinder bore 4 (as shown by double-dot-dash lines in FIG. 2). The balance of the fuel jets 44 can flow along the inner surface of the cylinder bore 4 and can remain spaced from each other in the circumferential direction of the inside surface of the cylinder bore 4. In other words, the innermost portions of the fuel jets may approach each other and the outermost portions may remain spaced apart at the initiation of combustion.

As a result of the above-described flow patterns, most of the fuel jets 44 injected into the cylinder bore 4 likely gathers in the region proximate the inner surface of the cylinder bore 4 during an intake stroke and a subsequent compression stroke such that the concentration of the fuel becomes generally uniform proximate the inner surface of the cylinder. In other words, a rich air-fuel mixture layer 52 with a generally doughnut shaped configuration can be formed around the axis 3 of the cylinder bore 4 while a correspondingly leaner air-fuel mixture layer 53 surrounded by the rich air-fuel mixture layer 52 is located in the vicinity of the electrode 46 as seen in the plan view of the cylinder 2 (see FIG. 2).

At the last stage of the compression stroke, the lean air-fuel mixture layer 53 is ignited by the electrode 46 of the spark plug 47. Because the lean air-fuel mixture layer 53 is generated over a large crank angle span during an intake stroke and a compression stroke, the difference between the air-fuel ratio of the lean air-fuel mixture layer 53 and that of the rich air-fuel mixture layer 52 is not believed to continue to grow and the difference is not believed to be excessively prominent. In other words, since the lean air-fuel mixture layer 53 takes a long time to be generated and air is being inducted together with the fuel and in the same general direction as the fuel spray, a relatively stable stratified charge is believed to result in which the lean region is rich enough to allow ignition and the rich region is lean enough that the overall mixture (the ratio as a whole) is a lean air-fuel ratio.

Thus, the lean air-fuel mixture layer 53 has a relatively low air-fuel ratio and can be reliably ignited. When the lean air-fuel mixture layer 53 is ignited, the flame is immediately propagated through the rich air-fuel mixture layer 52 surrounding the lean air-fuel mixture layer 53. The rich air-fuel mixture layer 52 has an air-fuel ratio lower than that of the lean air-fuel mixture layer 53.

Thus, the likelihood of knocking in the outer perimeter is reduced, at least in part due to the relatively rich air-fuel mixture layer 52. Therefore, the overall air-fuel ratio can be lean, which results in higher fuel efficiency, while maintaining a significant level of ignition reliability. Such an operating condition usually will be encountered during low load operation of the engine 1.

Also, the internal combustion engine 1 has the variable valve timing device 36 for changing the timing of opening and closing of the intake valves 16 and/or the exhaust valves 20 and the variable valve lift device 40 for changing the lift of the intake valves 16 and/or the exhaust valves 20.

Moreover, when the movements of the intake valves 16 and/or the exhaust valves 20 are controlled with the variable valve timing device 36 and/or the variable valve lift device 40, the lower ends of the intake and/or exhaust valves 16 and 20 are less likely to contact the top surface 10 of the piston 8 during movement of the valves. Thus, in such an arrangement, the depth of the recesses 33 formed in the top surface 10 of the piston 8 can be reduced and the shape of the top surface 10 of the piston 8 can be simpler. In some arrangements, the top surface 10 of the piston 8 can be generally flat. When the top surface 10 of the piston 8 has a simpler and flatter shape, the fuel jets 44 injected from the fuel injection valve 45 can be guided by the top surface 10 of the piston 8 more precisely and can better form the rich air-fuel mixture layer 52 with a desired doughnut shape. Thus, the likelihood of knocking can be even further reduced. Moreover, In addition, when the depth of the recesses 33 can be reduced, the volume of the recesses 33 can be decreased. This means that the capacity of the combustion chamber 11 at the time when the piston 8 is in the top dead center position can be smaller. Such an arrangement would result in an increased compression ratio, which further improves fuel efficiency.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A direct injection internal combustion engine comprising a cylinder comprising a cylinder bore defined by a cylinder wall formed in a cylinder block, the cylinder bore being generally cylindrical with a longitudinally extending center axis, a cylinder head attached to the cylinder block, the cylinder head comprising an intake passage that extends through a first portion of the cylinder head and an exhaust passage that extends through a second portion of the cylinder head, an intake opening being defined at an intersection of the intake passage and a lower surface of the cylinder head, an intake valve being positioned within the intake opening, an exhaust opening being defined at an intersection of the exhaust passage and the lower surface of the cylinder head, an exhaust valve being positioned within the exhaust opening, a fuel injection valve extending through a portion of the cylinder head proximate the first portion of the cylinder head, the fuel injection valve being positioned to inject fuel obliquely downward into the cylinder bore, a spark plug extending through the cylinder head and having an electrode, the electrode being positioned within a region defined among the lower surface of the cylinder head, the cylinder wall and a piston, the electrode being intersected by the center axis, the fuel injection valve comprising a pair of injection orifices, each injection orifice having a major axis and a minor axis, and a tip that forms a V-shaped spray pattern having a first leg and a second leg, the electrode being positioned between the first leg and the second leg and each leg having a generally fan configuration when viewed in a direction transverse to the center axis, and the engine further comprising a controller that is adapted to initiate fuel injection during an intake stroke of the piston within the cylinder bore.

2. The engine of claim 1 further comprising a variable valve timing device, the variable valve timing device being configured to change the timing of opening and closing of at least one of the intake valve and the exhaust valve.

3. The engine of claim 2 further comprising a variable valve lift device, the variable valve lift device being configured to change the lift of at least one of the intake valve and the exhaust valve.

4. The engine of claim 1 further comprising a variable valve lift device, the variable valve lift device being configured to change the lift of at least one of the intake valve and the exhaust valve.

5. The engine of claim 1, wherein a majority of the intake passage extends at an angle substantially less than 90 degrees relative to the center axis.

6. The engine of claim 5, wherein a most downstream portion of the intake passage bends gently toward the combustion chamber and the bend is substantially less than 90 degrees.

7. The engine of claim 1, wherein the fuel injection valve is positioned generally below the intake passage in the cylinder head and an angle defined between a most downstream portion of the intake passage and the center axis is smaller than an angle defined between an axis of the fuel injection valve and the center axis.

8. The engine of claim 1, wherein the intake passage further comprises an inner surface of an intake pipe connected to the cylinder head.

9. The engine of claim 1, wherein the width of each injection orifice along the minor axis is between about 100 μm and about 200 μm.

10. The engine of claim 9, wherein the injected fuel spray pattern defines a generally symmetrical V-shape comprising a first leg and a second leg with the electrode being positioned between the first leg and the second leg.

11. The engine of claim 9, wherein the injected fuel spray pattern comprises a fan shape in a plane generally parallel to the center axis, the fan shape comprising an included angle of between about 60° and about 80°.

12. The engine of claim 1, wherein center lines of the fuel spray pattern originating from the injection orifices assumes a V-shape with an included angle of between about 30° and about 50°.

13. A direct injection internal combustion engine comprising:

a cylinder comprising a cylinder wall that defines a cylinder bore with an axis a cylinder head comprising an intake passage in a first side part thereof and an exhaust passage in a second side part thereof as viewed in a side view of the cylinder in which the axis of the cylinder bore is substantially coincident with a vertical line;

an intake valve which opens and closes the intake passage;

an exhaust valve which opens and closes the exhaust passage;

a fuel injection valve which can inject fuel obliquely downward from an outer side of the first side part of the cylinder head into the cylinder bore, the fuel injection valve comprising a pair of injection nozzles, each of the nozzles having an elongated rectangular shape;

a spark plug located generally on the axis of the cylinder bore;

the fuel being injected from the fuel injection valve forming a V-shape with the electrode being positioned between two legs of the V-shape as viewed in a plan view of the cylinder;

each of the legs being spread out in the shape of a sector as viewed in the side view of the cylinder; and a controller being configured to initiate fuel injection through the fuel injection valve during an intake stroke of a piston within the cylinder bore.

14. The engine of claim 13 further comprising one or more of:

a variable valve timing device for changing the timing of opening and closing of at least one of the intake valve and the exhaust valve; and a variable valve lift device for changing the lift of at least one of the intake valve and the exhaust valve.

15. The engine of claim 13, wherein, in the cylinder head, an angle of the intake passage with respect to the axis of the cylinder bore is smaller than that of the exhaust passage as viewed in the side view and a bottom surface of the intake passage at the side of the cylinder bore is curved to be convex upward as viewed in the side view and smoothly extends toward an upstream side of the intake passage.

16. The engine of claim 13, wherein the fuel injection valve is positioned generally below the intake passage in the cylinder head and an angle of the intake passage with respect to the axis of the cylinder bore is smaller than that of the fuel injection valve with respect to the axis of the cylinder bore as viewed in the side view.

17. The engine of claim 13, wherein in the vicinity of the one side part of the cylinder head, the intake passage is defined only by an inner surface of a passage integrally formed with the cylinder head and an inner surface of an intake pipe connected to the cylinder head.

18. The engine of claim 13, wherein at least one of the injection nozzles has a width of between about 100 μm and about 200 μm.

19. The engine of claim 13, wherein center lines of the fuel spray injected in the form of V-shape make an included angle between about 30° and about 50°.

20. The engine of claim 13, wherein the spark plug comprises an electrode and the injected fuel spray forms a generally symmetrical V-shape comprising a first leg and a second leg with the electrode being positioned between the legs as viewed in the plan view.

21. The engine of claim 20, wherein each leg of the injected fuel spray has a sector shape with an included angle of between about 60° and about 80° as viewed in the side view.

22. The engine of claim 13, wherein the legs of the spray pattern define a first angle viewed along the center axis and a second angle viewed transverse to the center axis, the first angle of at least one of the first leg and the second leg being smaller than the second angle.

23. The engine of claim 22, wherein the first angles of both the first leg and the second leg are smaller than the second angles of the first leg and the second leg.

24. A direct injection internal combustion engine comprising a cylinder comprising a cylinder bore defined by a cylinder wall, the cylinder bore being generally cylindrical with a longitudinally extending center axis, a cylinder head cooperating with the cylinder wall to at least partially define a combustion chamber, the cylinder head comprising an intake passage that extends through a first portion of the cylinder head and an exhaust passage that extends through a second portion of the cylinder head, a fuel injection valve extending through a portion of the cylinder head, the fuel injection valve comprising a pair of injection nozzles, each injection nozzle having a major axis and a minor axis, and the fuel injection valve being positioned to inject fuel obliquely downward directly into the cylinder bore, a spark plug extending through the cylinder head and having an electrode that is positioned within the combustion chamber, and means for injecting fuel during an intake stroke and thereby creating a generally stratified air-fuel charge in which a relatively leaner air-fuel mixture region is provided proximate the electrode of the spark plug and a relatively richer air-fuel mixture region is provided beyond the relatively leaner air-fuel mixture region when the overall air-fuel mixture comprises a higher than stoichiometric air-fuel mixture.

25. The engine of claim 1, wherein each of the first leg and the second leg of the spray pattern defines a first angle viewed along the center axis and a second angle viewed transverse to the center axis, the first angle of at least one of the first leg and the second leg being smaller than the second angle.

26. The engine of claim 25, wherein the first angles of both the first leg and the second leg are smaller than the second angles of the first leg and the second leg.

27. A direct injection internal combustion engine comprising:

a cylinder comprising a cylinder wall, the cylinder wall defining a cylinder bore, the cylinder bore comprising a longitudinal axis;

a cylinder head connected to the cylinder, a fuel injection valve mounted to the cylinder head, the fuel injection valve disposed to inject fuel obliquely downward into the cylinder bore;

the fuel injection valve comprising a spray emitting portion, the spray emitting portion consisting of a tip defining two elongated orifices, a spark plug located generally on the axis of the cylinder bore;

the fuel being injected from the spray emitting portion forming a V-shape with the electrode being positioned between two legs of the V-shape as viewed in a plan view of the cylinder;

each of the legs being spread out in the shape of a sector as viewed in a direction normal to the axis of the cylinder; and a controller being configured to initiate fuel injection through the fuel injection valve during an intake stroke of a piston within the cylinder bore.

* * * * *